(12) United States Patent
Yoshitsugi et al.

(10) Patent No.: US 9,074,060 B2
(45) Date of Patent: Jul. 7, 2015

(54) PROCESSES FOR MANUFACTURING ELECTRET FINE PARTICLES OR COARSE POWDER

(71) Applicant: SAKURA COLOR PRODUCTS CORPORATION, Osaka-shi, Osaka (JP)

(72) Inventors: Tomochika Yoshitsugi, Osaka (JP); Hiroshi Inoue, Osaka (JP)

(73) Assignee: SAKURA COLOR PRODUCTS CORPORATION, Osaka-shi (JP)

( * ) Notice: Subject to any disclaimer, the term of this patent is extended or adjusted under 35 U.S.C. 154(b) by 0 days.

(21) Appl. No.: 14/518,228

(22) Filed: Oct. 20, 2014

(65) Prior Publication Data

US 2015/0034745 A1 Feb. 5, 2015

Related U.S. Application Data

(62) Division of application No. 13/990,997, filed as application No. PCT/JP2011/077596 on Nov. 30, 2011.

(30) Foreign Application Priority Data

Dec. 2, 2010 (JP) ................................. 2010-269148
May 13, 2011 (JP) ................................. 2011-108725

(51) Int. Cl.
C08J 3/28 (2006.01)
C08F 2/46 (2006.01)
C08G 61/04 (2006.01)
G02F 1/167 (2006.01)
C08J 3/09 (2006.01)
C08J 3/12 (2006.01)
B02C 19/18 (2006.01)

(52) U.S. Cl.
CPC . *C08J 3/28* (2013.01); *G02F 1/167* (2013.01); *C08J 3/09* (2013.01); *C08J 3/122* (2013.01); *C08J 2327/12* (2013.01); *C08J 2327/16* (2013.01); *C08J 2327/20* (2013.01); *G02F 2001/1678* (2013.01); *B02C 19/18* (2013.01); *C08J 3/12* (2013.01); *C08J 2427/18* (2013.01)

(58) Field of Classification Search
USPC .......... 522/156, 155, 150, 1, 161, 157; 520/1
See application file for complete search history.

(56) References Cited

U.S. PATENT DOCUMENTS

| 6,355,749 B1 | 3/2002 | Chung et al. |
| 8,485,657 B2 | 7/2013 | Pinto et al. |
| 8,709,660 B2 * | 4/2014 | Takamura et al. ......... 429/231.8 |

FOREIGN PATENT DOCUMENTS

| JP | 2004-085635 A | | 3/2004 |
| JP | 2005-154705 | * | 6/2005 |
| JP | 2005-154705 A | | 6/2005 |
| JP | 2007-102148 A | | 4/2007 |
| WO | 2009/031293 | * | 3/2009 |

OTHER PUBLICATIONS

Kawamura et al, JP 2005-154705 Machine Translation, Jun. 16, 2005.*
International Search Report of PCT/JP2011/077596, mailing date of Dec. 27, 2011.

* cited by examiner

*Primary Examiner* — Ling Choi
*Assistant Examiner* — Jessica E Whiteley
(74) *Attorney, Agent, or Firm* — Westerman, Hattori, Daniels & Adrian, LLP

(57) ABSTRACT

The present invention provides a process for producing electret fine particles or coarse powder that can be uniformly electrified and exhibits excellent electrophoretic properties.

Specifically, the present invention relates to the production processes (1) and (2) below:

(1) A process for producing electret fine particles, comprising emulsifying a fluorine-containing material that contains a vinylidene fluoride-hexafluoropropylene-tetrafluoroethylene terpolymer in a liquid that is incompatible with the fluorine-containing material to obtain emulsified particles; and subjecting the emulsified particles to electron ray irradiation, radial ray irradiation, or corona discharge treatment.

(2) A process for producing electret coarse powder, comprising subjecting a resin sheet containing a vinylidene fluoride-hexafluoropropylene-tetrafluoroethylene terpolymer to electron ray irradiation, radial ray irradiation, or corona discharge treatment to process the resin sheet into an electret resin sheet; and pulverizing the electret resin sheet.

3 Claims, 2 Drawing Sheets (a)

(b)

9,074,060 B2

PROCESSES FOR MANUFACTURING ELECTRET FINE PARTICLES OR COARSE POWDER

CROSS-REFERENCE TO RELATED APPLICATIONS

This is a divisional of U.S. application Ser. No. 13/990,997 filed May 31, 2013, which is a 371 of PCT/JP2011/077596 filed Nov. 30, 2011, the entire contents of which is incorporated herein by reference.

TECHNICAL FIELD

The present invention relates to a process for producing electret fine particles or coarse powder that is useful as electrophoretic particles used for a full-color electrophoretic display device ("electronic paper").

BACKGROUND ART

In recent years, the electrophoretic display methods, which employ the electrophoresis of charged fine particles (electret fine particles), have been attracting attention as the most promising technology for next-generation display devices. However, this technology still has many problems, including the shape of charged fine particles, small and unstable charge potential), secondary aggregation or sedimentation of electrophoretic particles, inadequate deletion of previously displayed images, unsatisfactory response speed, and the like. Therefore, research and development has been conducted to correct such shortcomings.

Patent Documents 1 and 2 disclose electret particles for the above applications.

Patent Document 1 discloses negatively charged fine particles produced through addition of a resin serving as an electron trap to a superfine spherical core resin particles having a particle diameter of 1-10 μm obtained by polymerization of a polymeric fine particle material and through irradiation of the particles with a 10-300 kGy electron beam to form negatively charged electret fine particles, wherein the core resin is colored with a desired color (claim 1).

Patent Document 2 discloses colored and negatively charged microparticulates obtained by adding an electron trap material, a pigment, etc., to a polymeric fine particle monomer material; producing spherical fine particles having a particle diameter of 5-10 μm through suspension polymerization, emulsion polymerization, dispersion polymerization or the like; and forming negatively charged electret microparticulates either by irradiating the particles with a 10-50 kGy electron beam and heating the particles for a ten or so minutes at 90 to 110° C., or irradiating the particles with a 10-50 kGy electron beam at 90 to 110° C., wherein the negatively charged electret microparticulates are colored with a desired color and have a potential of −50 to −100 mV (claim 10).

However, the various hitherto-known electret particles are often unevenly electrified and thereby have a problem of insufficient electrophoretic properties. Therefore, development of electret particles that can be uniformly electrified and have excellent electrophoretic properties has been desired. Further, since electret coarse powder is suitable for the electrophoretic particles for large-screen displays, development of electret coarse powder having the above advantageous characteristics has also been desired.

CITATION LIST

Patent Documents

[Patent Document 1] JP2005-154705A
[Patent Document 2] JP2007-102148A

SUMMARY OF INVENTION

Technical Problem

An object of the present invention is to provide a method for producing electret fine particles or coarse powder that can be uniformly electrified and that have excellent electrophoretic properties.

Solution to Problem

In order to achieve the above object, the present inventors conducted extensive research and found that the object can be achieved by producing electret fine particles or coarse powder from a specific terpolymer resin. With this finding, the inventors completed the present invention.

Specifically, the present invention relates to the following methods for producing electret fine particles or coarse powder.

1. A process for producing electret fine particles, comprising emulsifying a fluorine-containing material that contains a vinylidene fluoride-hexafluoropropylene-tetrafluoroethylene terpolymer in a liquid that is incompatible with the fluorine-containing material to obtain emulsified particles; and subjecting the emulsified particles to electron ray irradiation, radial ray irradiation, or corona discharge treatment.

2. The process according to Item 1, wherein the emulsified particles are processed into microcapsule particles, and the microcapsule particles are subjected to electron ray irradiation, radial ray irradiation, or corona discharge treatment.

3. The process according to Item 2, wherein the microcapsule particles are dispersed in an electrophoretic medium to be subjected to electron ray irradiation, radial ray irradiation, or corona discharge treatment.

4. The process according to Item 1, wherein the emulsified particles contain a pigment.

5. The process according to Item 1, wherein the liquid that is incompatible with the fluorine-containing material serves as the electrophoretic medium.

6. The process according to Item 1, wherein the electret fine particles have a mean particle diameter of 0.02 to 20 μm.

7. A process for producing electret coarse powder, comprising subjecting a resin sheet containing a vinylidene fluoride-hexafluoropropylene-tetrafluoroethylene terpolymer to electron ray irradiation, radial ray irradiation, or corona discharge treatment to process the resin sheet into an electret resin sheet; and pulverizing the electret resin sheet.

8. The process according to Item 7, wherein the electret coarse powder has a mean particle diameter of 0.02 to 3 mm.

9. The process according to Item 7, wherein the electret coarse powder contains a pigment.

Hereunder, the process for producing electret fine particles or coarse powder according to the present invention is explained in detail.

The process for producing electret fine particles or coarse powder according to the present invention is classified into a method of processing a fluorine-containing material into emulsified particles and processing the emulsified particles into electret particles (First Embodiment), and a method of processing a fluorine-containing resin sheet into an electret sheet, and pulverizing the sheet (Second Embodiment). In both of these methods, by incorporating a vinylidene fluoride-hexafluoropropylene-tetrafluoroethylene terpolymer in a fluorine-containing material or a fluorine-containing resin sheet, it is possible to obtain electret fine particles or coarse powder that can be uniformly electrified and has excellent electrophoretic properties.

First Embodiment

In the First Embodiment, electret fine particles are produced by emulsifying a fluorine-containing material containing a vinylidene fluoride-hexafluoropropylene-tetrafluoroethylene terpolymer in a liquid that is incompatible with the fluorine-containing material to obtain emulsified particles, and subjecting the emulsified particles to electron ray irradiation, radial ray irradiation, or corona discharge treatment.

In the present invention, the fluorine-containing material may be formed only of the terpolymer; however, other fluorine-containing compounds may also be used with the terpolymer. However, the amount of other fluorine-containing compounds in the fluorine-containing material is preferably not more than 50 wt %, more preferably 1 to 20 wt %.

Other examples of fluorine-containing compounds include various known fluorine-containing resins, fluorine-containing oils, fluorine-containing adhesives, fluorine-containing elastomers, fluorine-containing varnishes, polymerizable fluorocarbon resins, and the like.

Examples of the fluorine-containing resins include tetrafluoroethylene resin and the like, such as polymers of polytetrafluoroethylene (PTFE) or derivatives thereof represented by $FR_1C=CR_1R_2$, wherein $R_1$=F or H and $R_2$=F or H or Cl or any other element.

Examples of the fluorine-containing oils include perfluoropolyether oil, chlorotrifluoroethylene oligomer, and the like, such as perfluoropolyether oil (product name: DEMNUM, Daikin Industries, Ltd.), chlorotrifluoroethylene oligomer (product name: DAIFLOIL, Daikin Industries, Ltd.), and the like.

Examples of the fluorine-containing adhesives include ultraviolet-curable fluorinated epoxy adhesives and the like, such as (product name: OPTODYNE, Daikin Industries, Ltd.).

Examples of the fluorine-containing elastomers include straight-chain fluoropolyether compounds, such as SIFEL3590-N, SIFEL2610, SIFEL8470 (all products of Shin-Etsu Chemical Co., Ltd.), and the like.

Examples of the fluorine-containing varnishes include tetrafluoride ethylene-vinyl monomer copolymer (product name: Zeffle, Daikin Industries, Ltd.) and the like.

Examples of the polymerizable fluorocarbon resins include polymerizable amorphous fluorocarbon resin (product name: CYTOP, Asahi Glass Co., Ltd.) and the like.

Liquids that is incompatible with the fluorine-containing material are not limited. Examples of these liquids include water, ethylene glycol (EG), propylene glycol (PG), glycerin, and silicone oil. A suitable liquid is selected from these liquids depending on the fluorine-containing material to be used. Further, an "electrophoretic medium" may be used as the liquid that is incompatible with the fluorine-containing material. Examples of electrophoretic media include ethylene glycol (EG), propylene glycol (PG), glycerin, silicone oil, fluorine-containing oil, and petroleum oil. Examples of silicone oil include dimethyl silicone oil and the like. Examples of fluorine-containing oil include perfluoropolyether oil and the like.

Examples of the emulsifiers used for emulsification include polyvinyl alcohol, ethylene, and maleic anhydride. The content of the emulsifier in the liquid that is incompatible with the fluorine-containing material is preferably about 1 to 10 wt %.

The process for preparing the emulsified particles may comprise 1) a first step of stirring an oil phase obtained by dissolving the fluorine-containing material in a solvent such as ethyl acetate, methyl ethyl ketone, or acetone; 2) a second step of stirring a mixture (water phase) of a emulsifier and a liquid that is incompatible with the fluorine-containing material; and 3) a third step of stirring the water phase to mix it with the oil phase, thereby preparing emulsified particles. The mixing may be performed using a known mixing device such as a mixer, homogenizer, or the like. Mixing may be performed under increased temperature or increased pressure as required. With this method, a suspension in which the particles of the terpolymer are suspended is produced.

It is possible to obtain colored emulsified particles by incorporating a pigment in the fluorine-containing material in advance. In this case, colored electret fine particles, which are useful as a material for full-color electronic paper, are obtained.

The inorganic pigment is not limited. For example, black pigments containing carbon as a main component, such as carbon black, lamp black, bone black, or botanical black, can be used. As white pigments, titanium oxide, zinc oxide, calcium carbonate, barium sulfate, and silicon oxide can be used. White pigments are useful for production of white electrophoretic particles or for the adjustment of the specific gravity of the particles.

The organic pigment is not limited. Examples of organic pigments include azo pigments such as β-naphthol-based pigments, naphthol AS-based pigments, acetoacetic acid-based pigments, aryl amide-based pigments, pyrazolone-based pigments, acetoacetic acid arylamide-based pigments, pyrazolone-based pigments, β-naphthol-based pigments, β-oxynaphthoic acid-based pigments (BON acid-based azo pigments), naphthol AS-based pigments, or acetoacetic acid allylide-based pigments; and polycyclic pigments, such as phthalocyanine-based pigments, anthraquinone-based (threne) pigments, perylene-based or perinone-based pigments, indigo-based or thioindigo-based pigments, quinacridone-based pigments, dioxazine-based pigments, isoindolinone-based pigments, quinophthalone-based pigments, metal complex pigments, methine-based or azo methine-based pigments, diketopyrrolopyrrole-based pigments, and the like. In addition, azine pigments, daylight fluorescent pigments (resin dye solid solution), hollow resin pigments, nitroso pigments, nitro pigments, natural pigments, and the like may also be used.

The organic pigment may be selected from commercial products, such as Symuler Fast Yellow 4GO, Fastogen Super Magenta RG, Fastogen Blue TGR (DIC Corporation), Fuji Fast Red 7R3300E, Fuji Fast Carmine 527 (Fuji Shikiso K.K.), and the like.

The mean particle diameter of the pigments is preferably not more than 20 μm, more preferably not more than 3 μm. In particular, by setting the mean particle diameter of the pigments to not more than 0.2 μm, the resulting electret fine particles can be colored with a see-through color. The lower limit of the mean particle diameter is not particularly limited; however, the lower limit is preferably about 0.01 μm. Pulverization of pigments into fine particles may be performed using known mechanical pulverization such as ball mill or the like. The mean particle diameters of pigments and the emulsified particles in this specification are found by diluting a dispersion of the target object with an appropriate sufficiently compatible dispersion medium, and measuring the median diameter of the diluted solution using a dynamic light scattering particle size distribution measurement device (LB-550: product of HORIBA).

The mean particle diameter of the emulsified particles obtained by emulsification is preferably, but not limited to, about 0.02 to 20 μm, more preferably about 0.1 to 5 μm.

The emulsified particles may be directly processed by an electron ray or a radial ray into electret particles; however, it is more preferable to first subject the particles to microcapsulation to obtain microcapsule particles before processing them into electret particles. The microcapsulation can be easily performed by mixing the emulsified particles with the wall material of the microcapsules and stirring the mixture.

The microcapsules may have any known structure, provided that they incorporate emulsified particles. For example, the microcapsules may be formed by incorporating emulsified particles in the wall material.

Generally, a resin-based wall film is suitable for the wall material. Examples of the resin include various thermoplastic resins and thermosetting resins, such as epoxy resins, polyamide resins, acrylonitrile resins, polyurethane resins, polyurea resins, urea-formaldehyde-based resins, melamine-formaldehyde-based resins, benzoguanamine resins, butylated melamine resins, butylated urea resins, urea-melamine-based resins, vinylidene fluoride resins, and the like. The resin materials for the resin component may be used alone or in a combination of two or more kinds. When the particles are processed into microcapsules, the microcapsulation may be appropriately performed by polymerizing the resin materials.

The method for microcapsulation may be selected from, for example, interfacial polymerization (polycondensation, addition condensation), in situ polymerization, coacervation methods, drying-in liquid methods, spray-drying methods, and the like.

For example, the microcapsulation may be carried out using in situ polymerization, comprising 1) a first step of stirring the fluorine-containing material (oil phase); 2) a second step of stirring a mixture (water phase) of the emulsifier and a liquid that is incompatible with the fluorine-containing material; 3) a third step of stirring the water phase to mix it with the oil phase, thereby preparing emulsified particles; and 4) a fourth step of adding the above resin as a wall material to the emulsion of the emulsified particles and stirring the mixture under heat. With this method, the microcapsules are appropriately produced.

The emulsified particles or microcapsule particles can be processed into electret particles by subjecting the emulsified particles or microcapsule particles to electron ray or radial ray irradiation or corona discharge treatment in a state where the emulsified particles or microcapsule particles are suspended in a liquid component that is used for the preparation of the particles. It is also possible to process these particles into electret particles by subjecting them to electron ray or radial ray irradiation or corona discharge treatment once the particles have been separated as powder or the powder has been dispersed in an electrophoretic medium. The conditions for electron or radial ray irradiation and corona discharge treatment are not limited, insofar as electret particles are obtained. For example, the irradiation may be carried out by emitting an approximately 50 to 800 kV electron ray of approximately 10 to 1,000 kGy, more preferably approximately 100 to 500 kGy, using an electron beam accelerator. Radial ray irradiation may be performed, for example, by emitting a gamma ray of approximately 1 to 15 kGy. The temperature in irradiation is not limited; however, the temperature is preferably in the range of 50 to 350° C., more preferably in the range of 100 to 200° C.

Through the above steps, uniformly charged electret fine particles of, in a preferred embodiment, about 0.02 to 20 μm are obtained. Further, since the electret particles are produced through electron ray irradiation, radial ray irradiation, or corona discharge treatment, it is possible to obtain semipermanently charged electret fine particles. This semipermanent charge is different from a naturally occurring electrostatic charge.

Second Embodiment

In the Second Embodiment, electret coarse powder is produced by subjecting a resin sheet containing a vinylidene fluoride-hexafluoropropylene-tetrafluoroethylene terpolymer to electron ray irradiation, radial ray irradiation, or corona discharge treatment to process the resin sheet into an electret sheet, and then pulverizing the sheet.

Preferable examples of resin sheets include a sheet produced from a dispersion containing emulsified particles (before being processed into electret particles) obtained in First Embodiment. The method for processing the dispersion into a sheet is not limited; for example, a sheet may be obtained by forming a film having a desired thickness by using a spin coater or a bar coater, and drying the film. Alternatively, a commercially available sheet containing a vinylidene fluoride-hexafluoropropylene-tetrafluoroethylene terpolymer may be used.

The resin sheet may contain a pigment. By containing a pigment, the resulting electret coarse powder is colored. The color electret coarse powder is useful as a material for full-color electronic paper. Any known inorganic or organic pigments may be used.

The inorganic pigment is not limited. For example, black pigments containing carbon as a main component, such as carbon black, lamp black, bone black, or botanical black, can be used. As white pigments, titanium oxide, zinc oxide, calcium carbonate, barium sulfate, and silicon oxide can be used. White pigments are useful for production of white electrophoretic coarse powder or for the adjustment of the specific gravity of the coarse powder.

The organic pigment is not limited. Examples of organic pigments include azo pigments such as β-naphthol-based pigments, naphthol AS-based pigments, acetoacetic acid-based pigments, aryl amide-based pigments, pyrazolone-based pigments, acetoacetic acid arylamide-based pigments, pyrazolone-based pigments, β-naphthol-based pigments, β-oxynaphthoic acid-based pigments (BON acid-based azo pigments), naphthol AS-based pigments, or acetoacetic acid allylide-based pigments; and polycyclic pigments, such as phthalocyanine-based pigments, anthraquinone-based (threne) pigments, perylene-based or perinone-based pigments, indigo-based or thioindigo-based pigments, quinacridone-based pigments, dioxazine-based pigments, isoindolinone-based pigments, quinophthalone-based pigments, metal complex pigments, methine-based or azo methine-based pigments, diketopyrrolopyrrole-based pigments, or the like. In addition, azine pigments, daylight fluorescent pigments (resin dye solid solution), hollow resin pigments, nitroso pigments, nitro pigments, natural pigments, and the like may also be used.

The organic pigment may be selected from commercial products, such as Symuler Fast Yellow 4GO, Fasdtogen Super Magenta RG, Fasdtogen Blue TGR (DIC Corporation), Fuji Fast Red 7R3300E, Fuji Fast Carmine 527 (Fuji Shikiso K.K.), and the like.

The mean particle diameter of the pigments is preferably not more than 20 µm, more preferably not more than 3 µm. In particular, by setting the mean particle diameter of the pigments to not more than 0.2 µm, the resulting electret coarse powder can be colored with a see-through color. The lower limit of the mean particle diameter is not particularly limited; however, the lower limit is preferably about 0.01 µm. Pulverization of the pigments into fine particles may be performed using known mechanical pulverization such as ball mill or the like.

The thickness of the resin sheet is not limited; however, in terms of the efficiency in the process of producing an electret sheet or in terms of the mean particle diameter of the coarse powder obtained by pulverization of the sheet, the thickness is preferably about 100 to 3000 µm, more preferably about 100 to 1000 µm.

In the method of the present invention, an electret sheet is obtained first by subjecting a resin sheet to electron ray irradiation, radial ray irradiation, or corona discharge treatment. The conditions of the electron ray irradiation, radial ray irradiation, or corona discharge treatment are not limited insofar as the resin sheet is processed into an electret sheet; however, it is preferable to use a device capable of simultaneously and uniformly performing electron ray irradiation, radial ray irradiation, or corona discharge treatment over the entire sheet from a perpendicular direction.

The irradiation amount is not limited and may be appropriately determined according to the material and the thickness of the sheet. When the sheet has a large thickness, the acceleration voltage and the irradiation amount are increased to ease the processing of the entire sheet into an electret sheet. For example, irradiation may be carried out by applying an approximately 50 to 800 kV electron ray of approximately 10 to 1,000 kGy, more preferably approximately 100 to 500 kGy using an electron beam accelerator. Radial ray irradiation may be performed, for example, by emitting a gamma ray of about 1 to 15 kGy. The temperature in irradiation or discharge is not limited; however, the temperature is preferably in the range of 50 to 350° C., more preferably in the range of 100 to 200° C. Further, through this production of an electret sheet by using electron ray irradiation, radial ray irradiation, or corona discharge treatment, it is possible to obtain a semipermanently charged electret sheet.

After the resin sheet is processed into an electret resin sheet, the sheet is pulverized using a pulverization device. The pulverization apparatus is not limited, and any known plastic film pulverization device (three-roll mill or the like) may be used. The mean particle diameter of the coarse powder obtained by the pulverization is not limited; however, the mean particle diameter is preferably about 0.02 to 3 mm, more preferably about 1 to 2 mm. By specifying the mean particle diameter within this range, a desirable response speed is ensured when the powder is used as electrophoretic particles for a large-screen display. This mean particle diameter is an arithmetic mean value of the diameters of any 10 particles of coarse powder measured using an optical microscope.

With the above steps, the resulting electret coarse powder is negatively charged in a uniform manner.

The electret fine particles and coarse powder undergo electrophoresis by being placed between electrode plates and having an external voltage applied between the electrode plates. The electrophoretic medium used herein is not limited, and examples thereof include air and liquid media. Examples of liquid media include ethylene glycol (EG), propylene glycol (PG), glycerin, silicone oil, fluorine-containing oils, and petroleum oils. Examples of silicone oils include dimethyl silicone oil. Examples of fluorine-containing oils include, in particular, perfluoropolyether oil. Silicone oils are particularly preferred among these media.

The electret coarse powder is an atypical powder. Therefore, unlike existing spherical fine particles that are only capable of dot-based display, atypical particles are capable of plane-based display. Accordingly, the display area is increased and the gap between each particle of the coarse powder is reduced.

Electrophoretic Display Device

When the electret fine particles and the coarse powder contain a pigment having a mean particle diameter of not more than 0.2 µm (preferably in the range of 0.01 to 0.2 µm), the electret fine particles and the coarse powder are colored with a see-through color. The electret fine particles or coarse powder colored with a see-through color may be used as charged particles for an electrophoretic color display device. A suitable electrophoretic color display device to which the electret fine particles or coarse powder is applied as charged particles comprises: a plurality of display units for individually displaying pixels; first electrodes; and second electrodes; the display units being arranged in a matrix form and each having at least three-layered cells that contain charged particles; each of the first electrodes being provided on the upper or lower surface of each cell; each of the second electrodes being provided on the side edge of each cell; and the charged particles having different colors for every cell in each display unit.

In the electrophoretic display device above, each pixel has a display unit containing cells with at least three-layers. Since each of the cells contains charged particles of different see-through colors, a single pixel can display various colors by having a voltage applied to the first and second electrodes. Thus, no unused pixels are present in the image range during color image display. In the present invention, the colors for the three or more cells (a different color for each cell) are not limited; however, red (R), green (G), and blue (B), are preferable. In the present invention, the "side edge of the cell" refers to the upper peripheral edge, lower peripheral edge, and side of the cell.

The present invention is specifically described below with reference to example drawings.

As shown in FIG. 1, an electrophoretic display device 1 comprises a plurality of display units 2. Each display unit 2 has first to third cells 5a to 5c, and each of the cells is provided with a first electrode 3 and a second electrode 4 therein.

Each of the pixels for forming an image is provided with a display unit 2 having first to third cells 5a to 5c that are laminated in the height direction, as shown in FIG. 1. The first to third cells 5a to 5c are made of a transparent material such as glass or polyethylene terephthalate so that light can pass through. The bottom of each cell is provided with a base 7 for supporting the first electrode 3 and the second electrode 4. A reflector for reflecting light passing through the display unit 2, or a white board or black board that serves as the background color of an image, may be provided below the third cell 5c. Further, a shielding means may be provided on the upper peripheral edge of the first cell 5a so as to shield first to third charged particles 6a to 6c (described below) when the first to third charged particles 6a to 6c are accumulated on the second electrode 4.

Each of the first to third cells 5a to 5c is therein provided with, as shown in FIG. 1, the first electrode 3 and the second electrode 4 for collecting the first to third charged particles 6a to 6c (described below). The second electrode 4 is provided over the entire circumference of the inner side of each of the first to third cells 5a to 5c. The first electrode 3 is located on the bottom of each of the first to third cells 5a to 5c on the inner side of the second electrode 4 so that short circuiting between the first electrode 3 and the second electrode 4 is prevented. The first electrode 3 can have various forms, such as a plate, stripes, a lattice, or dots. The material of the first electrode 3 and the second electrode 4 is not limited. For example, a highly conductive metal, such as copper or silver, a transparent conductive resin, an ITO (indium tin oxide) film, or the like can be used.

Moreover, as shown in FIG. 1, the first cell 5a contains the first charged particles 6a, which are colored red (R), the second cell 5b contains the second charged particles 6b, which are colored green (G), and the third cell 5c contains the third charged particles 6c, which are colored blue (B). Further, each of the first to third cells 5a to 5c is filled with an electrophoretic medium for electrophoresing the first to third charged particles 6a to 6c.

Next, the operation of the above-mentioned electrophoretic display device 1 is described with reference to FIGS. 2 and 3. In FIG. 2, first to third cells 5a to 5c are collectively referred to as a "cell 5," and first to third charged particles are collectively referred to as "charged particles 6."

When the electrophoretic display device 1 is to display red in a specific pixel, voltages are applied to the first electrode 3 and the second electrode 4 so that the first electrode 3 is positive while the second electrode 4 is negative in the first cell 5a, which contains the red-colored (R) first charged particles 6a. As a result, the first charged particles 6a are attracted to the first electrode 3 and located on the bottom of the first cell 5a (FIG. 2 (a)). Conversely, when voltages are applied to the first electrode 3 and the second electrode 4 so that the first electrode 3 is negative while the second electrode 4 is positive in the second and third cells 5a and 5b, the second and third charged particles 6b and 6c are attracted to the second electrode 4 and located on the inner side of the second and third cells 5a and 5b (FIG. 2 (b)). When the display unit 2 in this state is observed from above, only the color of the first charged particles 6a (red) is perceived. The colors of the second charged particles 6b (green) and third charged particles 6c (blue) cannot be perceived because these particles are hidden behind the second and third cells 5b and 5c, the second electrode 4, or the shielding means. Thus, the pixel displays red (FIG. 3 (a)).

Further, in order to display green in a specific pixel, the first electrode 3 is made positive while the second electrode 4 is made negative in the second cell 5b so that the second charged particles 6b are moved to the bottom of the second cell 5b (FIG. 2 (a)). In the first and third cells 5a and 5c, the first electrode 3 is made negative while the second electrode 4 is made positive so that the first and third charged particles 6a and 6c are moved to the inner side of the first and third cells 5a and 5c (FIG. 2 (b)). When the display unit 2 in this state is observed from above, only the color of the second charged particles 6b (green) is perceived. The colors of the first charged particles 6a (red) and third charged particles 6c (blue) cannot be perceived because these particles are hidden behind the first and third cells 5a and 5c, the second electrode 4, or the shielding means. Thus, the pixel displays green (FIG. 3 (b)).

Similarly, in order to display blue in a specific pixel, the first electrode 3 is made positive while the second electrode 4 is made negative in the third cell 5c so that the third charged particles 6c are moved to the bottom of the third cell 5c (FIG. 2 (a)). In the first and second cells 5a and 5b, the first electrode 3 is made negative while the second electrode 4 is made positive so that the first and second charged particles 6a and 6b are moved to the inner side of the first and second cells 5a and 5b (FIG. 2 (b)). When the display unit 2 in this state is observed from above, only the color of the third charged particles 6c (blue) is perceived. The colors of the first charged particles 6a (red) and second charged particles 6b (green) cannot be perceived because these particles are hidden behind the first and second cells 5a and 5b, the second electrode 4, or the shielding means. Thus, the pixel displays blue (FIG. 3 (c)).

In addition, in order to display white in a specific pixel, the values of the voltage to be applied to the first electrode 3 and the second electrode 4 are adjusted so that the first to third charged particles 6a to 6c are dispersed in the first to third cells 5a to 5c (FIG. 3 (d)). When the display unit 2 in this condition is observed from above, the colors of the first to third charged particles 6a to 6c are presented as an additive color mixture. Thus, the pixel color is white.

As described above, in the electrophoretic display device 1, the display units 2, each corresponding to a single pixel, comprise the first to third cells 5a to 5c, which are laminated. The first to third charged particles 6a to 6c are caused to move between the first to third cells 5a to 5c, thereby allowing a single pixel to display various colors. Accordingly, unused pixels, which do not contribute to image display, are not present in the image range. Consequently, a full color image can be displayed without using a color filter.

Advantageous Effects of Invention

The production method according to the present invention enables production of uniformly charged electret fine particles or coarse powder by using a vinylidene fluoride-hexafluoropropylene-tetrafluoroethylene terpolymer as a fluorine-containing material or a fluorine-containing resin sheet. The obtained electret fine particles or coarse powder are useful as electret fine particles for electrophotography toner, electronic paper, and the like. In addition, the fine particles and coarse powder are also useful as materials for electret fibers, nonwoven fabric, filtering media (filters), vacuum cleaner bags, electret capacitor microphones, and the like.

DESCRIPTION OF EMBODIMENTS

Figure 1:
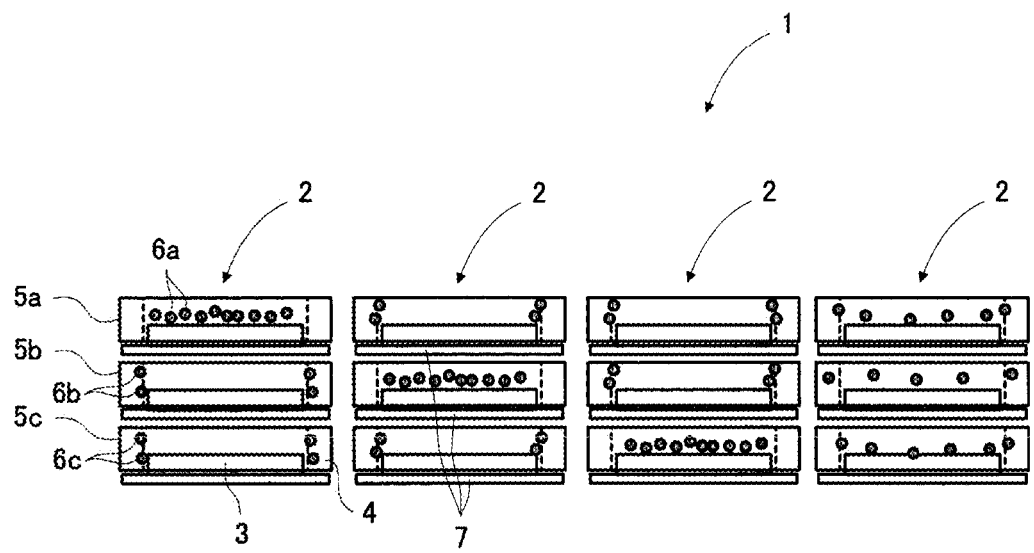
FIG. 1 is a front cross-sectional schematic view of an electrophoretic display device (an example).
Figure 2:
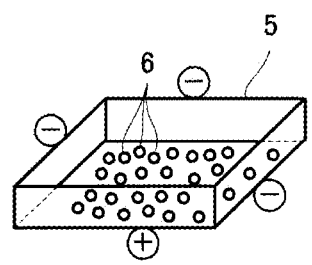
FIG. 2 is a perspective view showing movement of charged particles in an electrophoretic display device (an example).
Figure 2:
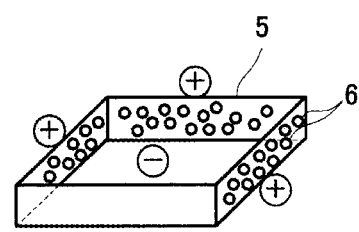
Figure 3:
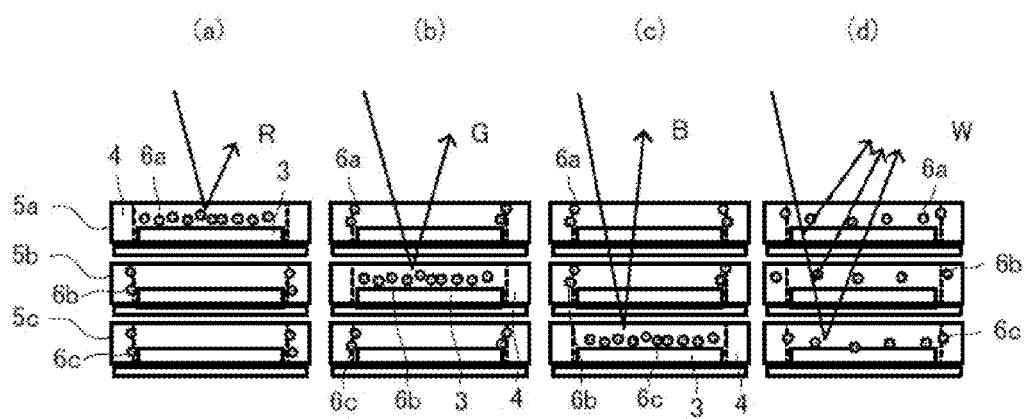
FIG. 3 is a front cross-sectional schematic view showing operation of an electrophoretic display device (an example).

The present invention is more specifically explained below in reference to the Examples and Comparative Examples. The present invention is, however, not limited to those examples, etc.

Examples 1-4 and Comparative Examples 1-5

The components shown in Table 1 were added to an emulsifier and stirred with a homogenizing mixer (6000 rpm, 6 minutes). Thereafter, the mixture was heated while stirring using a dissolver (300 rpm, 80° C., 8 hours). The emulsifier was obtained by mixing ion exchange water and PVA224 (polyvinyl alcohol: thickener) at a ratio of 9:1. A suspension containing fine particles dispersed therein was thus obtained.

Zeffle GK-510 (tetrafluoride ethylene/vinyl monomer copolymer) was added to improve dispersibility of the pigment (dye) in the resin.

TABLE 1

| Formulation | Examples | | | | Comparative Examples | | | | |
|---|---|---|---|---|---|---|---|---|---|
| | 1 | 2 | 3 | 4 | 1 | 2 | 3 | 4 | 5 |
| Zeffle GK-510 | 6.20 | 6.20 | 6.20 | 6.20 | 45.50 | 6.20 | 6.20 | 6.20 | 6.20 |
| Symuler fast yellow 4G0 | 0.60 | | | | 4.50 | | | | 0.60 |
| Fastogen super magenta RG | | 0.60 | | | | 0.60 | | | |
| Fastogen blue TGR | | | 0.60 | | | | 0.60 | | |
| Carbon black #30 | | | | 0.60 | | | | 0.60 | |
| Desmodur L75 | 1.50 | 1.50 | 1.50 | 1.50 | 12.00 | 1.50 | 1.50 | 1.50 | 1.50 |
| VT470 5% ethyl acetate solution | 61.70 | 61.70 | 61.70 | 61.70 | | | | | |
| VP100 7% ethyl acetate solution | | | | | | 61.70 | | | |
| FM450 15% ethyl acetate solution | | | | | | | 61.70 | | |
| AR100 15% solution | | | | | | | | 61.70 | |
| AR110 15% solution | | | | | | | | | 61.70 |
| | 70.00 | 70.00 | 70.00 | 70.00 | 62.00 | 70.00 | 70.00 | 70.00 | 70.00 |
| Effect | | | | | | | | | |
| Electrophoresis | A | A | A | A | B | B | B | C | C |

| Product name | Manufacturer | Formulation |
|---|---|---|
| Zeffle GK-510 | Daikin Industries, Ltd. | Tetrafluoride ethylene/vinyl monomer copolymer |
| Symuler fast yellow 4G0 | DIC | Disazo |
| Fastogen super magenta RG | DIC | Quinacridone |
| Fastogen blue TGR | DIC | Phthalocyanine |
| Carbon black #30 | Mitsui Chemicals, Inc. | Carbon black |
| Desmodur L75 | Sumika Bayer Urethane Co., Ltd. | Isocyanate curing agent |
| VT470 | Daikin Industries, Ltd. | Vinylidene fluoride/hexafluoropropylene/tetrafluoroethylene terpolymer |
| VP100 | Daikin Industries, Ltd. | Vinylidene fluoride/tetrafluoroethylene copolymer |
| Optool FM450 | Daikin Industries, Ltd. | Fluorine-containing methacrylate copolymer |
| Optool AR100 | Daikin Industries, Ltd. | Fluorine polymer (dissolved in 15% MIBK) |
| Optool AR110 | Daikin Industries, Ltd. | Fluorine polymer (dissolved in 15% MIBK) |

Electrophoresis Evaluation
A: Uniform electrophoresis was observed.
B: Uneven electrophoresis was observed.
C: Electrophoresis was not observed.

Then, each suspension was subjected to electron ray irradiation using an electron beam accelerator, thereby processing the fine particles into electret fine particles. After solid-liquid separation, electret fine particles were obtained. The electron ray irradiation was performed under the following conditions.

TABLE 2

| | Accelerating voltage kV | Irradiation amount kGy | Temperature ° C. |
|---|---|---|---|
| Example 1 | 800 | 1000 | 140 |
| Example 2 | 300 | 50 | 140 |
| Example 3 | 300 | 100 | 140 |
| Example 4 | 300 | 500 | 140 |
| Comparative Example 1 | 300 | 2000 | 30 |
| Comparative Example 2 | 300 | 50 | 30 |
| Comparative Example 3 | 300 | 100 | 30 |
| Comparative Example 4 | 300 | 500 | 30 |
| Comparative Example 5 | 300 | 500 | 30 |

Electrophoresis Test

Figure 4:
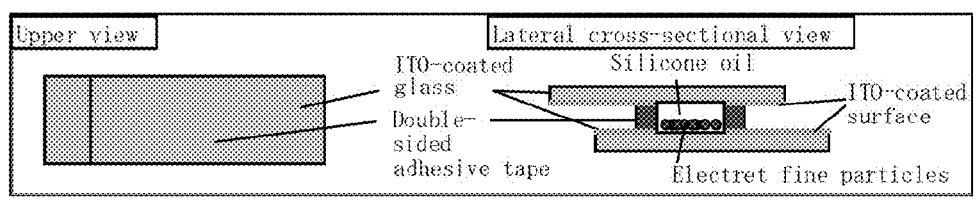
FIG. 4 shows an upper view and a lateral cross-sectional view of an electrophoretic display device used in the Examples and Comparative Examples.

An electrophoresis test was conducted for the electret fine particles obtained in Examples 1 to 4 and Comparative Examples 1 to 5 using the electrophoresis test device shown in FIG. 4. Specifically, the test was conducted as follows.

An ITO-coated glass sheet (Kuramoto Co., Ltd., 300 mm (height)×400 mm (width)×0.7 mm (thickness), not more than 7 Ω/sq) was cut into a 30 mm×50 mm piece. Sumitomo 3M double-sided adhesive tape (Scotch super-strength adhesive tape, 19 mm (width)×4 m (length)×1 mm (thickness)) was cut into a 20-mm piece, and a 8-mm dia. hole was made in the central portion.

The 20-mm adhesive tape was attached somewhat left of the center of the ITO-coated glass surface.

The hole in the double-sided adhesive tape was filled with electret fine particles in an amount without overflow.

The liner was peeled off from the other side of the double-sided adhesive tape, i.e., the side not attached to the glass surface, and a 30 mm×50 mm piece of ITO-coated glass was placed on that side of the adhesive tape. Here, to allow portions to be clipped with a crocodile clip, the two pieces of glass were placed with staggered positioning as shown in the lateral view of FIG. 4. The two ITO-coated surfaces have an interval corresponding to the thickness of the double-sided adhesive tape (1 mm).

The double-sided adhesive tape between the two pieces of glass was pricked with a syringe (Nipro) containing silicone oil (Shin-Etsu Chemical Co., Ltd), and the hole in the adhesive tape was filled with silicone oil.

The edges of the two ITO-coated pieces of glass were connected with a crocodile clip, and a voltage was applied from an external power supply (HJPM-5R0.6 high-pressure power supply, Matsusada Precision Inc.), thereby examining the electrophoretic properties of the electret fine particles. The evaluation results of the electrophoretic properties are summarized in Table 1.

Examples 1' to 4' and Comparative Example 1' to 5'

Each of the suspensions prepared in Examples 1 to 4 and Comparative Examples 1 to 5 was processed into an individual sheet, and the resulting sheet was subjected to electron ray irradiation to obtain an electret sheet. Thereafter, the electret resin sheet was cut into small pieces with scissors and then pulverized (0.02 to 1 mm) by using a three-roll mill, thereby obtaining electret coarse powder.

Electrophoresis Test

An electrophoresis test was conducted for the obtained electret coarse powder by using the electrophoresis test device shown in FIG. 4. More specifically, the test was conducted in the same manner as in Examples 1 to 4 and Comparative Examples 1 to 5, except that the electret coarse powder was used instead of electret fine particles. The evaluation results of the electrophoretic properties are summarized in Table 3.

TABLE 3

| Electrophoresis | | Electrophoresis | |
|---|---|---|---|
| Example 1' | A | Comparative Example 1' | B |
| Example 2' | A | Comparative Example 2' | B |
| Example 3' | A | Comparative Example 3' | B |
| Example 4' | A | Comparative Example 4' | C |
| | | Comparative Example 5' | C |

Electrophoresis Evaluation
A: Uniform electrophoresis was observed.
B: Uneven electrophoresis was observed.
C: Electrophoresis was not observed.

Examples 5 to 8 and Reference Examples 1 and 2

The components shown in Table 4 were added to an emulsifier and stirred with a homogenizing mixer (6000 rpm, 6 minutes). Thereafter, the mixture was heated while stirring using a dissolver (300 rpm, 80° C., 8 hours). The emulsifier was obtained by mixing ion exchange water and PVA224 (polyvinyl alcohol: thickener) at a ratio of 9:1. A suspension containing fine particles dispersed therein was thus obtained.

Zeffle GK-510 (tetrafluoride ethylene/vinyl monomer copolymer) was added to improve dispersibility of the pigment (dye) in the resin.

TABLE 4

| Formulation | Examples | | | | Reference Examples | |
|---|---|---|---|---|---|---|
| | 5 | 6 | 7 | 8 | 1 | 2 |
| Zeffle GK-510 | 9.00 | 9.00 | 9.00 | 9.00 | 9.00 | 9.00 |
| CS-RD200Y | 1.00 | | | | | |
| CS-Y200Y | | 1.00 | | | | |
| CS-GA200Y | | | 1.00 | | | |
| CS-C200Y | | | | 1.00 | | |
| Toner Magenta E-02 | | | | | 1.00 | |
| Toner Yellow HG | | | | | | 1.00 |
| Desmodur L75 | 2.00 | 2.00 | 2.00 | 2.00 | 2.00 | 2.00 |
| VT470 5% ethyl acetate solution | 60.00 | 60.00 | 60.00 | 60.00 | 60.00 | 60.00 |
| | 72.00 | 72.00 | 72.00 | 72.00 | 72.00 | 72.00 |
| Effect | | | | | | |
| Pigment particle size (nm) | 183 | 175 | 82 | 55 | 949 | 926 |
| Evaluation | B | B | A | A | D | D |
| Transparency (visual comparison) | A | A | A | A | B | B |

| Product name | Manufacturer | Formulation |
|---|---|---|
| Zeffle GK-510 | Daikin Industries, Ltd. | Tetrafluoride ethylene/vinyl monomer copolymer |
| VT470 | Daikin Industries, Ltd. | Vinylidene fluoride/hexafluoropropylene/tetrafluoroethylene terpolymer |
| CS-RD200Y | Todakogyo corp. | Pigment |
| CS-Y200Y | Todakogyo corp. | Pigment |
| CS-GA200Y | Todakogyo corp. | Pigment |
| CS-C200Y | Todakogyo corp. | Pigment |
| Toner Magenta E-02 | Clariant K.K. | Pigment |
| Toner Yellow HG | Clariant K.K. | Pigment |

TABLE 4-continued

| Desmodur L75 | Sumika Bayer Urethane Co., Ltd. | Isocyanate curing agent |

Evaluation of pigment particle size (μm)
A: 0.02 μm ≤ a ≤ 0.1 μm
B: 0.1 μm < a ≤ 0.2 μm
C: 0.2 μm < a ≤ 0.3 μm
D: 0.3 μm < a
Transparency
A: Viewable
B: Not viewable The mean particle diameter of the pigments contained in the suspensions obtained in Examples 5 to 8 and Reference Examples 1 and 2 was measured. The measurement results are shown in Table 4. A drop of each suspension was placed on a glass slide, and a glass cover was placed thereon. The glass cover was lightly pressed from above. The transparency of each suspension was visually observed. It was graded as Level A if the other side of the slide glass was viewable (transparent), and graded as Level B if the other side of the slide glass was not viewable (opaque). The evaluation results of the transparency are summarized in Table 4.

The results in Table 4 revealed that the suspension has a see-through color when the mean particle diameter of the pigment falls in the range of 0.02 to 0.2 μm. Accordingly, by using electret fine particles or coarse powder containing a pigment having a mean particle diameter of 0.02 to 0.2 μm as charged particles, an electrophoretic display device suitable for color display can be obtained.

REFERENCE NUMERALS

1. Electrophoretic display device
2. Display unit
3. First electrode
4. Second electrode
5a to 5c. First to third cells
6a to 6c. First to third charged particles

The invention claimed is:

1. A process for producing electret coarse powder, comprising subjecting a resin sheet containing a vinylidene fluoride-hexafluoropropylene-tetrafluoroethylene terpolymer to electron ray irradiation, radial ray irradiation, or corona discharge treatment to process the resin sheet into an electret resin sheet; and pulverizing the electret resin sheet.

2. The process according to claim 1, wherein the electret coarse powder has a mean particle diameter of 0.02 to 3 mm.

3. The process according to claim 1, wherein the electret coarse powder contains a pigment.

\* \* \* \* \*